United States Patent [19]

Akao

[11] Patent Number: 5,075,163

[45] Date of Patent: Dec. 24, 1991

[54] PACKAGING MATERIAL FOR PHOTOGRAPHIC PHOTOSENSITIVE MATERIALS

[75] Inventor: Mutsuo Akao, Kanagawa, Japan

[73] Assignee: Fuji Photo Film Co., Ltd., Minami-ashigara, Japan

[21] Appl. No.: 418,684

[22] Filed: Oct. 2, 1989

Related U.S. Application Data

[63] Continuation of Ser. No. 102,414, Sep. 29, 1987, abandoned.

[30] Foreign Application Priority Data

Sep. 30, 1986 [JP] Japan ............... 61-229500

[51] Int. Cl.⁵ .................. B32B 5/30; B32B 27/08
[52] U.S. Cl. .................. 428/323; 428/35.2; 428/516
[58] Field of Search ............... 428/516, 323, 35.2

[56] References Cited

U.S. PATENT DOCUMENTS

| | | | |
|---|---|---|---|
| 4,452,846 | 6/1984 | Akao | 428/516 |
| 4,513,050 | 4/1985 | Akao | 428/516 |
| 4,565,720 | 1/1986 | Yaeo | 428/516 |
| 4,579,781 | 4/1986 | Akao | 428/516 |
| 4,661,395 | 4/1987 | Akao | 428/458 |
| 4,661,401 | 4/1987 | Akao | 428/516 |
| 4,663,218 | 5/1987 | Akao | 428/461 |
| 4,701,359 | 10/1987 | Akao | 428/516 |

FOREIGN PATENT DOCUMENTS 59-52184 9/1986 Japan.

*Primary Examiner*—James J. Seidleck
*Attorney, Agent, or Firm*—Burns, Doane, Swecker & Mathis

[57] ABSTRACT

A packaging material for photographic photosensitive material comprising a coextruded double layer film, having a thickness of 30 to 150 μm, containing 0.5 to 50 g/m² of a light-shielding material, and consisting of a linear low-density polyethylene resin layer having a thickness of 30 to 70% of total thickness of the coextruded double layer film and comprising linear low-density polyethylene resin having a melt index of 0.1 to 10 g/10 minutes and a density of 0.870 to 0.939 g/cm³ and a high-density polyethylene resin layer comprising high-density polyethylene resin having a melt index of 0.1 to 5 g/10 minutes and a density of 0.950 to 0.970 g/cm³.

This packaging material is excellent in physical strength, particularly in Young's modulus, tensile strength, wear resistance and surface strength, and is suitable for a heavy material having a sharp edge.

13 Claims, 2 Drawing Sheets

PACKAGING MATERIAL FOR PHOTOGRAPHIC PHOTOSENSITIVE MATERIALS

This application is a continuation, of application Ser. No. 102,414, filed Sept. 29, 1987 now abandoned.

BACKGROUND OF THE INVENTION

1. Field of the Invention

This invention relates to a packaging material suitable for photographic photosensitive materials.

2. Description of Prior Art

Various types of packaging materials for photographic photosensitive materials have been put to practical use, and various properties are required according to their uses.

As a packaging material for photographic photosensitive materials, it is necessary to have various properties such as packaging material slitability, light-shielding, gas barrier, moistureproofness, antistatic property, rigidity, physical strength such as breaking strength, tear strength, impact puncture strength, Gelbo test strength and wear resistance, heat sealing properties such as heat seal strength, cut-seal ability, hot tack properties (hot-seal ability) and seal ability with other materials, flatness, slipping character and the like. The cut-seal ability is the slitability for fusing seal. In this sealing method, the hot plate for press is changed to a knife-shaped, and melting adhesion and cutting simultaneously occur.

Generally, it is difficult to satisfy these properties by a single material. Therefore, a single layer film of a high-pressure low-density polyethylene (LDPE) kneaded with carbon black or a pigment, and a composite laminated film composed of a LDPE film and a flexible sheet such as paper, aluminum foil or cellophane, etc. have been employed. An example of the conventional packaging film is shown in FIG. 10. This film is the most fundamental single-layer packaging material consisting of a light-shielding LDPE film layer 5a which is very thick. Another example of the conventional packaging film is shown in FIG. 11. This film was used for packaging a product which particularly requires moistureproofness, and it is composed of a light-shielding LDPE film layer 5a, a light-shielding metal foil layer 6 laminated on it through an adhesive layer 3, and a flexible sheet layer 4 laminated thereon through an adhesive layer 3. Still another example of conventional packaging film is shown in FIG. 12. This film was used as inner sheet of double-sheet gusset bag for packaging color photographic printing paper, and it is composed of a light-shielding LDPE film layer 5a, a light-shielding metal foil layer 6, a flexible sheet layer 4, and a light-shielding LDPE film layer 5a. They are laminated in that order, and an adhesive layer 3 is provided between each layer.

On the other hand, the present inventor has continued to investigate various packaging materials mainly for photographic photosensitive materials, and he has already disclosed the packaging materials of which physical strength is raised by combining two uniaxially stretched film layers (U.S. Pat. No. 4,331,725). With respect to the packaging material containing a low-pressure linear low-density polyethylene (L-LDPE), a packaging material comprising at least one light-shielding film layer of polyethylene polymer of which more than 50 wt. % is L-LDPE and containing more than 1 wt. % of a light-shielding material has been disclosed (U.S. Pat. No. 4,452,846). The packaging material of FIG. 13 is a fundamental packaging material composed of a light-shielding L-LDPE resin film layer 1a alone. The L-LDPE resin produced by copolymerization of ethylene with heptene-1 or octene-1 in liquid process having a density of 0.870 to 0.925 g/cm$^3$ ASTM D-1505 and a melt index of 1.2 to 10 g/10 minutes at 190° C. ASTM D-1238 was found to be excellent in physical strength, heat sealing properties, etc. It also has a small difference in tear strength between the longitudinal direction and the lateral direction. Based upon these findings, a light-shielding packaging material for light-sensitive materials has been developed comprising a layer of the polyethylene polymer film molded by the inflation process containing 40 to 99 wt. % of this resin having a thickness of more than 20 μm and a ratio of tear strength in the longitudinal direction/tear strength in the lateral direction being more than 0.6 (U.S. Ser. No. 821,414). A L-LDPE resin film at least containing more than 40 wt. % of L-LDPE resin, 0.1 to 15 wt. % of carbon black and 0.03 to 1 wt. % of fatty acid amide lubricant was found to be excellent in slipping character without the occurrence of blocking. A packaging material for photographic photosensitive material containing this film as the inner surface layer has also been developed (U.S. Ser. No. 821,414). A packaging material has also been developed composed of a foamed sheet layer 4 and two light-shielding L-LDPE resin film layers 1a, 1a disposed on both sides thereof each through an adhesive layer 3 as shown in FIG. 14.

Physical properties of the conventional laminated films were not satisfactory except the films using L-LDPE resin, and during packaging, the films were sometimes torn or punctured or the heat seal of the films sometimes separated. In addition, when a large amount of a light-shielding material, such as carbon black was added, the physical strength of the film was lowered. Then, the amount was set at about 3 wt. %, and thickness of the film was more than 70 μm. As a result, the film was stiff, and working efficiency of the packaging process was badly affected. The cost of the packaging was also expensive. For example, in the laminated film of FIG. 11, the metal foil layer 6 was incorporated in order to raise gas barrier, moistureproofness, antistatic properties and the like. As a result, tear strength, impact puncture strength and Gelbo test strength were lowered to the contrary, and in the case of packaging a heavy material, rupture became a problem. In the case of the packaging material of FIG. 12, though its physical strength was raised by laminating another light-shielding LDPE resin film layer 5a, the physical strength was still unsatisfactory. The laminated film disclosed in the specification of U.S. Pat. No. 4,331,725 was inferior in heat sealing properties, impact puncture strength and Gelbo test strength. Unstretched high-density polyethylene (HDPE) inflation film also had similar problems. In the case of the HDPE film containing more than 1 wt. % of carbon black, physical strength particularly tear strength in the longitudinal direction was low because of molecular orientation. Inflation moldability of this resin was not good. When the thickness of the film was thinner than 40 μm, it was difficult to mold the inflation film having a lay-flat width of more than 50 cm. By employing L-LDPE resin for the packaging material, physical strength such as tear strength and Gelbo test, strength was raised, and the blending amount of a light-shielding material could be increased. However, for example, the light-shielding L-LDPE resin film disclosed in U.S. Pat. No. 4,452,846 was inferior in moistureproofness and gas barrier because of using low-density polyethylene resin. Moreover, when this film was employed for packaging a heavy photographic roll film having a sharp edge, black powder was occasionally generated by abrading the surface of the L-LDPE resin film with the edge of the roll film. Pinholes or breakage also were caused by the sharp edge. Besides, since tensile strength and Young's modulus were low, elongation or curling occurred when tension was added to the film during its molding, bag-making or packaging a product. The elongation also caused defects in light-shielding. Blocking and wrinkling of films were also liable to occur, and melt viscosity was high. Particularly, since inflation film moldability was inferior, various modifications of a molding machine were necessary.

SUMMARY OF THE INVENTION

An object of the invention is to provide a packaging material for photographic photosensitive materials excellent in physical strength particularly in Young's modulus, tensile strength, wear resistance and surface strength and suitable for even heavy materials having sharp edges.

Another object of the invention is to provide a packaging material for photographic photosensitive materials excellent in heat sealing properties.

Still another object of the invention is to provide a packaging material for photographic photosensitive materials hard to deform or be wrinkled and excellent in inflation moldability.

The present invention provides a packaging material for photographic photosensitive materials which has achieved the above objects. This packaging material comprises a coextruded double layer film having a thickness of 30 to 150 μm, containing 0.5 to 50 g/m² of a light-shielding material, and consisting of a linear low-density polyethylene resin layer having a thickness of 30 to 70% of the total thickness of the coextruded double layer film and comprising linear low-density polyethylene resin having a melt index of 0.1 to 10 g/10 minutes and a density of 0.870 to 0.939 g/cm³ and a high-density polyethylene resin layer comprising high-density polyethylene resin having a melt index of 0.1 to 5 g/10 minutes and a density of 0.950 to 0.970 g/cm³.

DETAILED DESCRIPTION OF THE INVENTION

Figure 1:
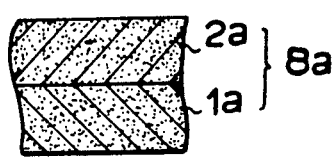
FIGS. 1 to 9 are partially sectional views of preferred embodiments of the invention.

The linear low-density polyethylene (L-LDPE) resin for the L-LDPE resin layer has a melt index (MI) of 0.1 to 10 g/10 minutes and a density of 0.870 to 0.939 g/cm³. This resin has a low crystallinity and a strong physical strength capable of compensating for the defects of the high-density polyethylene resin layer, i.e. low tear strength in the longitudinal direction caused by high molecular orientation and low impact puncture strength. This resin is also excellent in film moldability. The L-LDPE resin suitable for the packaging material of the invention can be divided into two groups.

The first group of the L-LDPE resin is the copolymer of ethylene and butene-1. A representative example of this L-LDPE resin is produced by the unipole process developed by Union Carbide Co. This process is a low-pressure vapor phase process using a highly active catalyst. The resin is also produced by ionic polymerization in a liquid process and a modified high-pressure process. The molecular weight distribution of the L-LDPE resin is narrower than the conventional low-density polyethylene (LDPE) resin produced in a high-pressure process at 3,000 atmospheres at 300° C. This resin is excellent in hot tack properties and seal ability of contraries, but it is liable to block. Its wear resistance is not so strong and the tear strength in longitudinal direction is usually weaker than that in lateral direction because of rather high molecular orientation. However, its physical strength is balanced, compared to the HDPE resin layer, and it is excellent in elongation. Examples of the L-LDPE resin belonging to the first group are "G-RESIN UNIPOLE" (UCC) and "NUC-POLYETHYLENE-LL" (NIPPON UNICAR) manufactured by vapor phase process, "IDEMITSU POLYETHYLENE L" (IDEMITSU PETROCHEMICAL)), "NISSEKI LINIREX" (NIPPON PETROCHEMICALS) and "SUCLEAR" (DUPONT DE NEMOUR, CANADA) manufactured by liquid phase process, and "NORSOFLEX" (CDF CHIMIE) manufactured by modified high-pressure process.

The second group of the L-LDPE resin is the copolymer of ethylene and 4-methylpentene-1, hexene-1 or octene-1. This resin is superior in physical strength including tear strength but inferior in cost to the first group resin. Examples of the L-LDPE resin belonging to the second group are "TUFLIN" (UCC) manufactured by vapor phase process, and "ULTZEX" (MITSUI PETROCHEMICAL INDUSTRIES), "STAMILEX" (DSM) and "DOWLEX" (DOW CHEMICAL) manufactured by the liquid phase process.

The high-density polyethylene (HDPE) resin for the HDPE resin layer has a MI of 0.1 to 5 g/10 minutes and a density of 0.950 to 0.970 g/cm³. This resin is excellent in wear resistance and moistureproofness, and is resistant to scratches or abrasions potentially caused by photographic photosensitive materials having sharp edges. Its Young's modulus is large, and it prevents elongation and curling even if a tension is applied during the lamination process with a flexible sheet, the packaging process packaging photographic photosensitive materials and the like. This resin is also excellent in film moldability.

The HDPE resin layer in the form of a coextruded film compensates for the defects of the L-LDPE resin layer in tensile strength, wear resistance and Young's modulus, and on the other hand, the inflation moldability and bag-making aptitude of the HDPE resin layer is improved by the coextrusion with the L-LDPE resin layer. The total thickness of the coextruded double layer film is 30 to 150 μm. When the thickness is thinner than 30 μm, the film is liable to wrinkle in the molding process. The properties necessary to the packaging material for photographic photosensitive materials such as moistureproofness, light-shielding, physical strength and heat seal strength cannot be secured. While, when the thickness is greater than 150 μm, shear rate becomes high. As a result, melt fracture occurs even though the resin temperature is raised. In the coextruded double layer film, the thickness balance between the L-LDPE resin layer and the HDPE resin layer is important in view of curling, film moldability, physical strength, packaging aptitude and the like. Thus, the thickness of the L-LDPE resin layer is 30 to 70% of the total thickness of the coextruded film, i.e. the thickness of the HDPE resin layer is 70 to 30% of the total thickness. When the thickness of the L-LDPE resin layer is less than 30% of the total thickness, the L-LDPE resin layer cannot compensate for the inferior film moldability of the HDPE resin. Moreover, tear strength and impact puncture strength become insufficient. The film is readily ruptured by the sharp edge of the roll or sheet of a photographic photosensitive material. While, when the thickness of the L-LDPE resin layer is more than 70% of the total thickness, Young's modulus becomes small. Wear resistance and tensile strength become insufficient, and the film is ruptured by the sharp edge of the roll or sheet of a photographic photosensitive material. Moistureproofness and gas barrier are also insufficient. Film moldability becomes inferior, and blocking and wrinkling occur. Moreover, the film is elongated by the tension during the lamination with a flexible sheet, and therefore, the laminated product curls. The most preferable thickness ratio is approximately 1:1.

Young's modulus (ASTM D-882) of the coextruded double layer film is usually more than 50 kg/mm$^2$.

In the case of producing the coextruded film by inflation process, the L-LDPE resin layer is preferably disposed on the inside because uneven thickness, wrinkling and furrow can be reduced.

The coextruded double layer film contains a light-shielding material. The layer containing the light-shielding material may be either or both of the L-LDPE resin layer and the HDPE resin layer. The light-sheilding material includes every material capable of shielding visible and ultraviolet light. Examples of the light-shielding material are various carbon blacks, iron oxide, zinc white, titanium dioxide, clay, aluminum powder, aluminum paste, calcium carbonate, mica, barium sulfate, talc, cadmium pigments, chrome yellow, red iron oxide, cobalt blue, copper-phthalocyanine pigments, monoazo and polyazo pigments and aniline blacks. Various carbon black, aluminum powder and aluminum paste from which volatile components are removed are preferred.

Carbon blacks are divided into gas black, oil furnace black, anthracene black, acetylene black, lamp black, vegetable black and animal black according to their origin. Among these, oil furnace carbon black is preferred in terms of light-shielding character, cost and improvement of properties. On the other hand, since acetylene black, Ketschen carbon black and graphite have antistatic characteristics, they are also preferred, though they are expensive. They may be blended with the oil furnace carbon black in order to improve its character. Suitable pH of carbon black is at 5 to 9, particularly at 6 to 8. Suitable mean particle size is smaller than 200 m$\mu$, and 10 to 120 m$\mu$, particularly 10 to 50 m$\mu$ is preferable. The oil furnace carbon black or the acetylene black having a pH 6 to 9 and a mean particle size of 15 to 30 m$\mu$ are preferred. By using the carbon black of such pH and particle size, a packaging material having the following merits is obtained. That is, the occurrence of fogging is rare, increase or decrease of photosensitivity rarely happens, light-shielding ability is great, the lumps of carbon black and pinholes such as fish eyes hardly occur, and the physical strength and heat sealing properties are improved.

As the preferable light-shielding material, metal powder is in second place. Metal powder is a light-reflective light-shielding material. It imparts a silver appearance, and it is excellent in moistureproofness, light-shielding, antistatic property, thermal shielding in the sunlight and gas barrier. As the metal powder, aluminum powder and its paste are preferable. The paste of aluminum powder is produced by adding mineral spirits and a small amount of a higher fatty acid such as stearic acid or oleic acid to form a paste at the production of aluminum powder according to a known method such as using a ball mill, a stamp mill or an atomizer. A polyolefin thermoplastic resin, such as various polypropylene resins, various polyethylene resins, ethylene-vinyl acetate copolymer (EVA) resin, ethylene-ethyl acrylate copolymer (EEA) resin and ethylene-acrylic acid copolymer (EAA) resin, is kneaded together with this aluminum paste while heating, and volatile components mainly mineral spirits are removed by a vacuum pump. This product is used as an aluminum paste compound resin or an aluminum paste masterbatch resin. The aluminum paste masterbatch resin is preferable because it eliminates the noxious smell and bad influence upon the photographic photosensitive materials. In order to eliminate the smell and bad influences upon the photographic photosensitive materials, the content of mineral spirit should be less than 0.1 wt. %. When the aluminum paste content of coextruded double layer film is made 2 wt. % by using a masterbatch resin containing 40 wt. % of aluminum paste and 1.0 wt. % of mineral spirits, one part by weight of the masterbatch resin is blended with 19 parts by weight of the main resin. Since a part of the mineral spirit evaporates during molding, the final content of the mineral spirits is less than 0.05 wt. %. The aluminum powder includes microflakes produced from aluminum foil which is crushed by a ball mill or a stamp mill, in addition to usual aluminum powder manufactured by atomization, dropping on a rotary disc or evaporation from melted aluminum. Since aluminum powder is unstable, it is stabilized by a known treatment. Production of metal flake is disclosed, for example, in U.S. Pat. No. 4,469,282 and Japanese Patents KOKOKY Nos. 37-6779 and 47-6718, and the production of metal powder for blending with plastics is disclosed, for example, in Japanese Patent KOKAI No. 59-75931.

The mean particle size of the light-shielding material is preferably smaller than 50 m$\mu$ most preferably smaller than 30 m$\mu$. By using such fine particles, film moldability is raised together with physical strength. When a lubricant such as fatty acid amide, silicone or higher fatty acid salt is further blended, fluidity of the L-LDPE resin and the HDPE resin is raised. Occurrence of blocking is reduced, and film processing and packaging aptitude are improved.

The content of the light-shielding material is 0.5 to 50 g/m$^2$. When the content is less than 0.5 g/m$^2$, light-shielding becomes insufficient. While, when the content is more than 50 g/m$^2$, physical strength, heat sealing properties and moistureproofness are greatly lowered. Furthermore, the wear resistance becomes inferior, and the film surface is abraded to form dust powder. This powder adheres to the surface of photographic photosensitive materials, and it causes trouble.

The form of the light-shielding material prior to blending may be powder, paste, wet state, masterbatch, pellets, etc.

As the method of blending a light-shielding material, the masterbatch method is preferred in points of cost and process. Various masterbatch methods are known, and any known method may be employed. Such a masterbatch method includes the method of dispersing carbon black into a polymer organic solvent solution to produce a masterbatch (Japanese Patent KOKOKU No. 40-26196) and the method of dispersing carbon black into polyethylene to produce a masterbatch (Japanese Patent KOKOKU No. 43-10362).

The L-LDPE resin layer and the HDPE resin layer may contain a thermoplastic resin in a content of less than 50 wt. %. This thermoplastic resin is preferably a polyolefin resin, such as LDPE resin, medium-density polyethylene (MDPE) resin, HDPE resin, L-LDPE resin, ethylene-propylene copolymer resin (random type or block type), ethylene-(butene-1) copolymer resin, propylene-(butene-1) copolymer resin, poly(butene-1) resin, polystyrene resin, poly(methyl methacrylate) resin, styrene-acrylonitrile copolymer resin, ABS resin, PP resin, crystalline propyleneolefin copolymer resin, modified polypropylene resin, modified polyethylene resin, polypropylene-maleic anhydride graft copolymer resin, chlorinated polyolefin resin such as chlorinated polyethylene resin, chlorinated HDPE resin, chlorinated LDPE resin, chlorinated polyethylene copolymer resin and chlorinated atactic PP resin, EVA resin, ethylene ionomer resin (copolymer of ethylene and unsaturated acid is crosslinked by a metal ion), poly(4-methylpentene-1) resin, ethylene-acrylic acid copolymer (EAA) resin, EMA resin, vinyl chloride-propylene resin, ethylene-vinyl alcohol copolymer resin, crosslinked polyethylene resin (electron beam irradiation crosslinking, chemical crosslinking, etc.), polyisobutylene resin, ethylene-vinyl chloride copolymer resin and poly(1,2-butadiene) resin.

Various additives may be added to the L-LDPE resin layer and the HDPE resin layer. Examples of the additives are described below.

(1) Plasticizer; phthalic acid esters, glycol ester, fatty acid ester, phosphoric acid ester, etc.
(2) Stabilizer; lead compounds, cadmium compounds, zinc compounds, alkaline earth metal compounds, organic tin compounds, etc.
(3) Antistatic agent; cationic surfactants, anionic surfactants, nonionic surfactants, ampholytic surfactants, etc.
(4) Flame retardant; phosphoric acid esters, phosphoric acid ester halides, halides, inorganic materials, polyols containing phosphor, etc.
(5) Filler; alumina, kaolin, clay, calcium carbonate, mica, talc, titanium dioxide, silica, etc.
(6) Reinforcing agent; glass lobing, metallic fiber, glass fiber, glass milled fiber, carbon fiber, etc.
(7) Coloring agent; inorganic pigments (Al, $Fe_2O_3$, $TiO_2$, ZnO, Cds, etc.), organic pigments, dyes, etc.
(8) Blowing agent; inorganic blowing agents (ammonium carbonate, sodium hydrogen carbonate), organic blowing agents (nitroso compounds, azo compounds), etc.
(9) Vulcanizing agent; vulcanization accelerator, acceleration assistant, etc.
(10) Deterioration preventing agent; ultraviolet absorber, antioxidant, metal deactivator, peroxide decomposing agent, etc.
(11) Lubricant; paraffin wax, fatty acids, silicones, stearic acid amide, metal salts of higher fatty acids, fatty acid amides, bis-fatty acid amides, alkylamines, esters, higher alcohols, etc.
(12) Coupling agent; silane compounds, titanium compounds, chromium compounds, aluminum compounds, etc.
(13) Various thermoplastic resins, rubbers The packaging material of the invention may be composed of the coextruded film alone, or other flexible sheet(s) may be laminated thereon. The flexible sheet capable of laminated on the coextruded film includes various unstretched, uniaxially stretched or biaxially stretched thermoplastic resin films such as various polyethylene films, ethylene copolymer films, polypropylene films, polyvinyl chloride films, polyvinylidene chloride films, polyamide films, polycarbonate films, polyester films and their modified resin films. Various flexible sheets such as a metallized film including aluminum-metallized film, aluminum-metallized paper, cellulose acetate film, cellophane, polyvinyl alcohol film, various papers, metal foil such as aluminum foil, non-woven fabric, cross laminated porous fabric, a porous film, foamed polyethylene sheet, foamed polypropylene sheet, foamed polystyrene sheet and foamed polyurethane sheet are also suitable.

Flexible sheet layers may be laminated according to a known method such as a heat sealing (hot bar sealing, impulse heat sealing, supersonic welding, etc.) or a method using an adhesive (wet laminating, dry laminating, hot melt laminating, extrusion laminating, etc.).

The adhesive is selected by considering both layers to be joined, and includes thermoplastic resin melt adhesives including a polyolefin adhesive, hot melt type gum adhesives and solution type adhesives. The polyolefin adhesives include a homopolymer and a copolymer of an olefin such as various polyethylenes, polypropylenes, polybutenes and ethylene-propylene copolymers and L-LDPE, a copolymer of an olefin and another monomer such as ethylene-vinyl acetate copolymer, ethylene-acrylate ester copolymer, various ionomers ("SURLYN" Dupont, "HIMIRAN" Mitsui Polychemicals Co., Ltd., etc.) and a graft copolymer. The solution type adhesives are divided into adhesives for wet lamination and adhesives for dry lamination. The adhesives for wet lamination are emulsion-type or latex-type. Examples of the emulsion-type adhesives are polyvinyl acetate emulsion, the emulsion of vinyl acetate-ethylene copolymer, the emulsion of vinyl acetate-acrylate ester copolymer, the emulsion of vinyl acetate-maleate ester copolymer, the emulsion of acrylic copolymer and the emulsion of ethylene-acrylic acid copolymer. Examples of the latex-type adhesives are natural rubber latex, styrene-butadiene rubber latex, acrylonitrile-butadiene rubber latex and chloroprene rubber latex. An example of the adhesives for dry lamination is polyurethane adhesive. Adhesives for hot melt lamination containing paraffin wax, microcrystalline wax, ethylene-vinyl acetate copolymer and ethylene-ethylacrylate copolymer, pressure-sensitive adhesives and temperature-sensitive adhesives may also be employed. The melting point of the adhesive employed is preferably more than 5° C. below the melting point of the flexible sheet in order to laminate without adverse influences upon the flexible sheet by a thermal melting adhesion.

The thickness of the adhesive layer formed by extrusion laminating using a thermoplastic resin is usually 8 to 50 μm, preferably 10 to 20 μm. However, the thickness is determined based upon cost, rate of application, thickness of the total layers, and etc., and accordingly, the thickness is not limited to the above range.

Representative embodiments of the packaging material of the invention are illustrated in FIGS. 1 to 9.

The packaging material of FIG. 1 is the most fundamental packaging material of the invention which is a simultaneously coextruded double layer film 8a manufactured by the inflation process. This film consists of a light-shielding L-LDPE resin layer 1a containing a light-shielding material and a light-shielding HDPE resin layer 2a containing a light-shielding material.

Figure 2:
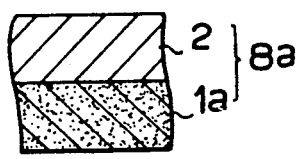

The packaging material of FIG. 2 is a modification of the packaging material of FIG. 1, and a HDPE resin layer 2 not containing a light-shielding material is employed instead of the light-shielding HDPE resin layer 2a.

Figure 3:
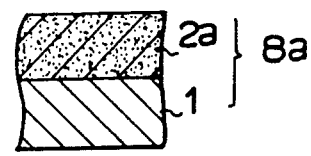

The packaging material of FIG. 3 is also a modification of the packaging material of FIG. 1, and a L-LDPE resin layer 1 is employed instead of the light-shielding L-LDPE resin layer 1a.

Figure 4:
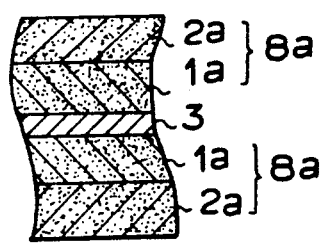

The packaging material of FIG. 4 is composed of two coextruded double layer films 8a of FIG. 1 laminated opposite to each other through an adhesive layer 3 so that both of the light-shielding HDPE resin layers 2a are disposed on the outside. Both surface layers of this packaging material are excellent in wear resistance, and have a large Young's modulus. This packaging material is particularly suitable for a roll of a photographic photosensitive material.

Figure 5:
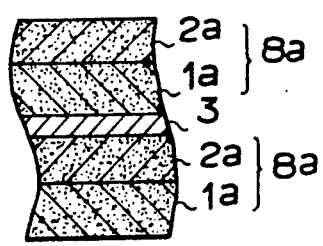

The packaging material of FIG. 5 is also composed of two coextruded double layer films 8a of FIG. 1 laminated in the same direction through an adhesive layer so that both surface layers are different from each other. When a bag is made using this packaging material, the side of the L-LDPE resin layer 1a is preferably disposed on the inside in order to utilize the superiority of the L-LDPE resin in heat sealing properties. This packaging material is suitable for an automatic bag-making machine.

Figure 6:
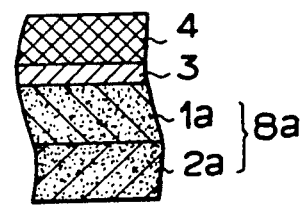

The packaging material of FIG. 6 is composed of the coextruded double layer film 8a of FIG. 1 and a flexible sheet layer 4 laminated thereon through an adhesive layer 3. Since the light-shielding HDPE resin layer 2a is disposed on the inner surface layer, this packaging material is suitable for packaging a product having a sharp edge.

Figure 7:
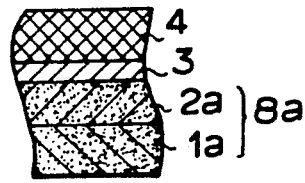

The packaging material of FIG. 7 is the same as that of FIG. 6 except that the L-LDPE resin layer 1a of the coextruded double layer film 8a is disposed on the outside. Since the L-LDPE resin layer 1a is excellent in heat sealing properties and impact puncture strength, this packaging material is suitable for products other than those heavy products having a sharp edge.

Figure 8:
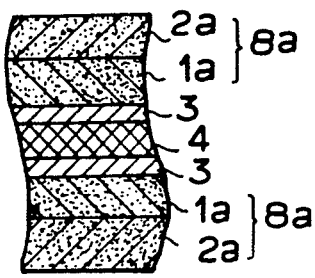

The packaging material of FIG. 8 is composed of a flexible sheet layer 4 and two coextruded double layer films 8a of FIG. 1 laminated opposite to each other on both sides of the flexible sheet layer each through an adhesive layer 3 so that both of the light-shielding HDPE layers 2a are disposed on the outside. This packaging material is suitable for a roll of a photographic photosensitive material having a weight of more than 4 kg. The curling of this packaging material hardly occurs.

Figure 9:
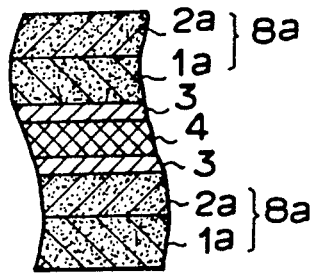

The packaging material of FIG. 9 is the same as that of FIG. 8 except that two double layer films 8a are disposed in the same direction so that surface layers are different from each other.

The packaging material of the invention is suitable for packaging silver halide photographic photosensitive materials, diazo photographic photosensitive materials, photosensitive resins, self-developing type photographic material and diffusion-transfer type photographic materials, etc. This packaging material is also usable for packaging foods such as chocolate, margarine, miso, wine and beer, medicines, dyes and other chemical materials such as developing solution and mordants for dying and the like. This packaging material is particularly suitable for a moistureproof light-shielding double sheet bag for photographic photosensitive materials of which quality is degraded by a small amount of a gas, light or moisture.

The package form may be conventional, and includes a single-sheet flat bag, a double-sheet flat bag, a square bottom bag, a self-standing bag, a single-sheet gusset bag, a double-sheet gusset bag, a film sheet, inner lining for a moistureproof box and a leader paper. The above bags may be a triple-sheet bag or more. In the cases of the double-sheet bags and the multiple-sheet bags, it is preferable to use the packaging material of the invention as the inner sheet and a laminated film as the outer sheet containing a thermoplastic resin layer having a thickness of 10 to 120 μm which is heat-sealable with the inner sheet. Moisture permeability is preferably less than 10 g/m²0.24 hours at 40° C. at 90% measured by JIS Z 0208.

The sealing form may also be conventional, and includes heat sealing, impulse heat sealing, supersonic welding and high frequency sealing. The methods of using an adhesive and a pressure sensitive adhesive may also be utilized.

EXAMPLES

The packaging materials of Examples 1 to 4 correspond to the embodiment of FIG. 1. The L-LDPE resin layer 1a is composed of 92.45 wt. % of L-LDPE resin "ULTZEX 2021L" (manufactured by MITSUI PETROCHEMICAL INDUSTRIES CO., LTD.) being a copolymer of ethylene and 4-methylpentene-1 having a MI of 2.1 g/10 minutes and a density of 0.920 g/cm³, 4.5 wt. % of LDPE resin, 3 wt. % of oil furnace carbon black and 0.05 wt. % of oleic acid amide lubricant "ARMOSLIP CP" (manufactured by LION AKZO CO., LTD.). The thickness is shown in Table 1. The HDPE resin layer 2a is composed of 97 wt. % of HDPE resin "HIZEX 5300S" (manufactured by MITSUI PETROCHEMICAL INDUSTRIES CO., LTD.) having a MI of 0.4 g/10 minutes and a density of 0.964 g/cm³ and 3 wt. % of oil furnace carbon black. The thickness is shown in Table 1. This double layer film 8a is formed by simultaneous coextrusion molding using the inflation process.

The packaging material of Example 5 corresponds to the embodiment of FIG. 1. The composition of the L-LDPE resin layer 1a is the same as Examples 1 to 4 except that "ULTZEX 2021L" is replaced by "ULTZEX 3520L" (manufactured by MITSUI PETROCHEMICAL INDUSTRIES CO., LTD.) being a copolymer of ethylene and 4-methylpentene-1 having a MI of 2.1 g/10 minutes and a density of 0.935 g/cm³. The composition of the HDPE resin layer is the same as examples 1 to 4. The thickness of the L-LDPE resin layer is 35 μm, and it is the same as the HDPE resin layer. Accordingly, the total thickness is 70 μm. This double layer film 8a is formed by simultaneous coextrusion molding using the inflation process.

The packaging material of FIG. 6 corresponds to the embodiment of FIG. 1. The composition of the L-LDPE resin layer is the same as Example 5. The composition of the HDPE resin layer is the same a Example 1 except that "HIZEX 5300S" is replaced by "HIZEX 3300F" (manufactured by MITSUI PETROCHEMICAL INDUSTRIES CO., LTD.) having a MI of 1.1 g/10 minutes and a density of 0.954 g/cm$^3$. The thickness of both layers are the same as Example 5. This double layer film 8a is formed by simultaneous coextrusion molding using the inflation process.

The packaging material of Example 7 corresponds to the embodiment of FIG. 1. The composition of the L-LDPE resin layer is the same as Example 1, and the composition of the HDPE resin layer is the same as Example 6. The thickness of both layers and the production method are the same as in Example 5.

The packaging material of Example 8 corresponds to the embodiment of FIG. 4. Two coextruded double layer films 8a are the same as Example 1 except that their thickness is 50 μm, and the adhesive layer 3 is a LDPE resin layer 15 μm in thickness. The total thickness is 115 μm.

The packaging material of Example 9 corresponds to the embodiment of FIG. 7. The L-LDPE resin layer 1a and the HDPE resin layer are the same as Example 1 except that the thickness of both layers is 45 μm respectively. The flexible sheet layer 4 is 35 g/m$^2$ in areal weight of bleached kraft paper.

The packaging material of Example 10 corresponds to the embodiment of FIG. 8. The L-LDPE resin layer 1a and the HDPE resin layer 2a are the same as Example 8. The flexible sheet layer 4 is 35 g/m$^2$ in areal weight of bleached kraft paper.

Figure 10:
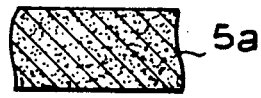
FIGS. 10 to 14 are partially sectional views of conventional packaging materials.

Conventional packaging material 1 corresponds the construction of FIG. 10. The light-shielding LDPE resin layer 5a contains 3 wt. % of oil furnace carbon black, and its thickness is 90 μm.

Figure 13:

Conventional packaging material 2 corresponds to the construction of FIG. 13. The L-LDPE resin layer 1a is the same as that of Example 1.

Figure 11:
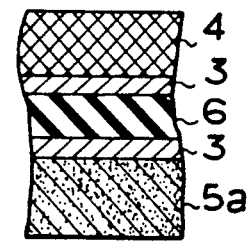

Conventional packaging material 3 corresponds to the construction of FIG. 11. The LDPE resin layer 5a contains 3 wt. % of carbon black and 0.05 wt. % of oleic acid amide lubricant, and its thickness is 70 μm.

Two adhesive layers 3 are the same LDPE resin extrusion adhesive layers 15 μm in thickness, and the metal foil layer 6 is an aluminum foil layer 7 μm in thickness. The flexible sheet layer 4 is 35 g/m$^2$ in areal weight of bleached kraft paper.

Figure 12:
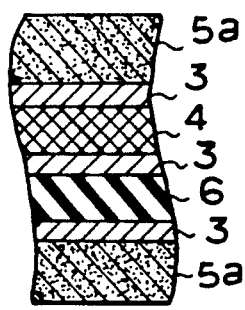

Conventional packaging material 4 corresponds to the construction of FIG. 12. The composition of both LDPE resin layers 5a is the same as that of Conventional packaging material 3, and their thicknesses are the same 50 μm. Three adhesive layers 3 are all LDPE resin extrusion adhesive layers 15 μm in thickness, and the metal foil layer 6 is aluminum foil layer 7 μm in thickness. The flexible sheet layer 4 is 35 g/m$^2$ in areal weight of bleached kraft paper.

Figure 14:
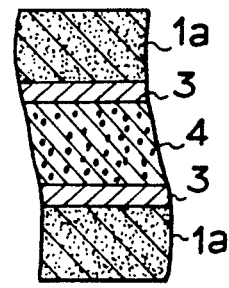

Conventional packaging material 5 corresponds to the construction of FIG. 14. Two L-LDPE resin layer 1a are the same as Example 2, and two adhesive layers 3 are the same LDPE resin extrusion adhesive layers 15 μm in thickness. The foamed sheet layer 4 is a foamed polyethylene sheet 1 mm in thickness.

The construction of the above packaging materials is tabulated in tables 1 and 3, and their properties are tabulated in Tables 2 and 4.

In the packaging materials, the following materials are employed;
LDPE layer:
  "DFD-0111" (Nippon Unicar Co., Ltd.)
  MI: 2.4 g/10 minutes
  Density: 0.923 g/cm$^3$
LDPE adhesive layer:
  "MIRASON 14"
  (Mitsui Polychemicals Co., Ltd.)
  MI: 5.1 g/10 minutes
  Density: 0.919 g/cm$^3$
Carbon black:
  "#44B Oil furnace carbon black"
  (Mitsubishi Chemical Industries Ltd.)
  Mean particle size: 21 mμ, pH: 7.7

TABLE 1

|  | Invention | | | | | | |
| --- | --- | --- | --- | --- | --- | --- | --- |
|  | 1 | 2 | 3 | 4 | 5 | 6 | 7 |
| L-LDPE Resin Layer | ULTZEX 2021L | ULTZEX 2021L | ULTZEX 2021L | ULTZEX 2021L | ULTZEX 3520L | ULTZEX 3520L | ULTZEX 2021L |
| MI (g/10 min.) | 2.1 | 2.1 | 2.1 | 2.1 | 2.1 | 2.1 | 2.1 |
| Density (g/cm$^3$) | 0.920 | 0.920 | 0.920 | 0.920 | 0.935 | 0.935 | 0.920 |
| Carbon Black (wt. %) | 3 | 3 | 3 | 3 | 3 | 3 | 3 |
| Thickness (μm) | 70 | 50 | 30 | 35 | 35 | 35 | 35 |
| HDPE Resin Layer | HIZEX 5300S | HIZEX 5300S | HIZEX 5300S | HIZEX 5300S | HIZEX 5300S | HIZEX 3300F | HIZEX 3300F |
| MI (g/10 min.) | 0.4 | 0.4 | 0.4 | 0.4 | 0.4 | 1.1 | 1.1 |
| Density (g/cm$^3$) | 0.964 | 0.964 | 0.964 | 0.964 | 0.964 | 0.954 | 0.954 |
| Carbon Black (wt. %) | 3 | 3 | 3 | 3 | 3 | 3 | 3 |
| Thickness (μm) | 30 | 50 | 70 | 35 | 35 | 35 | 35 |
| Total Thickness (μm) | 100 | 100 | 100 | 70 | 70 | 70 | 70 |
| Layer Constitution | FIG. 1 | FIG. 1 | FIG. 1 | FIG. 1 | FIG. 1 | FIG. 1 | FIG. 1 |

|  | Conventional | | Test |
| --- | --- | --- | --- |
|  | 1 | 2 | Method |
| L-LDPE Resin Layer | (LDPE) DFD-0111 | ULTZEX 2021L |  |
| MI (g/10 min.) | 2.4 | 2.1 | ASTM D-1238 |
| Density (g/cm$^3$) | 0.923 | 0.920 | ASTM D-1505 |
| Carbon Black (wt. %) | 3 | 3 |  |
| Thickness (μm) | 90 | 70 | JIS P-8118 |
| HDPE Resin Layer | — | — |  |
| MI (g/10 min.) | — | — | ASTM D-1238 |

TABLE 1-continued

|  | Density (g/cm³) | — | — | ASTM D-1505 |
|---|---|---|---|---|
|  | Carbon Black (wt. %) | — | — |  |
|  | Thickness (μm) | — | — | JIS P-8118 |
|  | Total Thickness (μm) | 90 | 70 | JIS P-8118 |
|  | Layer Constitution | FIG. 10 | FIG. 13 |  |

TABLE 2

|  | Invention | | | | | | | Conventional | | Test Method |
|---|---|---|---|---|---|---|---|---|---|---|
|  | 1 | 2 | 3 | 4 | 5 | 6 | 7 | 1 | 2 |  |
| Young's Modulus (kg/mm²) Longitudinal | 71 | 108 | 158 | 105 | 143 | 71 | 51 | 27 | 28 | ASTM D-882 |
| Young's Modulus (kg/mm²) Lateral | 81 | 63 | 51 | 58 | 78 | 87 | 56 | 26 | 28 | ASTM D-882 |
| Tensile Strength (kg/mm²) Longitudinal | 384 | 418 | 463 | 400 | 425 | 373 | 337 | 181 | 273 | JISZ-1702 |
| Tensile Strength (kg/mm²) Lateral | 271 | 306 | 346 | 288 | 272 | 350 | 335 | 134 | 254 | JISZ-1702 |
| Elongation (%) Longitudinal | 948 | 930 | 843 | 834 | 848 | 935 | 916 | 416 | 1187 | JISZ-1702 |
| Elongation (%) Lateral | 985 | 847 | 716 | 696 | 727 | 935 | 975 | 560 | 1207 | JISZ-1702 |
| Heat Seal Strength | A | A | A | A | A | A | A | C | A | I |
| Elapsed Heat Seal Strength | A | A | A | A | A | A | A | E | A | II |
| Corona Discharge Effect | A | A | A | A | A | A | A | B | C | III |
| Rigidity | B | A | A | A | A | B | B | C | C | IV |
| Deformation, Wrinkling | B | B | B | B | B | B | B | C | C |  |
| Surface Strength and Wear Resistance | A | A | A | A | A | B | B | E | C | V |
| Inflation Film Moldability | C | B | C | B | B | B | A | B | C |  |
| Right-Reverse Discrimination | A | A | A | A | A | A | A | E | E |  |
| Folding Quality | B | B | B | B | B | C | C | E | E |  |

TABLE 3

|  | Invention | | | Conventional | | | Test Method |
|---|---|---|---|---|---|---|---|
|  | 8 | 9 | 10 | 3 | 4 | 5 |  |
| L-LDPE Resin Layer | ULTZEX 2021L | ULTZEX 2021L | ULTZEX 2021L | (LDPE) DFD-0111 | (LDPE) DFD-0111 | ULTZEX 2021L |  |
| MI (g/10 min.) | 2.1 | 2.1 | 2.1 | 2.4 | 2.4 | 2.1 | ASTM D-1238 |
| Density (g/cm³) | 0.920 | 0.920 | 0.920 | 0.923 | 0.923 | 0.920 | ASTM D-1505 |
| Carbon Black (wt. %) | 3 | 3 | 3 | 3 | 3 | 3 |  |
| Thickness (μm) | 25 | 45 | 25 | 70 | 50 × 2 | 50 × 2 | JIS P-8118 |
| HDPE Resin Layer | HIZEX 5300S |  |  | — | — | — |  |
| MI (g/10 min.) | 0.4 | 0.4 | 0.4 | — | — | — | ASTM D-1238 |
| Density (g/cm³) | 0.964 | 0.964 | 0.964 | — | — | — | ASTM D-1505 |
| Carbon Black (wt. %) | 3 | 3 | 3 | — | — | — |  |
| Thickness (μm) | 25 | 45 | 25 | — | — | — | JIS P-8118 |
| Flexible Sheet Layer | — | Bleached Kraft Paper | Bleached Kraft Paper | Bleached Kraft Paper | Bleached Kraft Paper | Foamed PE Sheet |  |
| Areal Weight (g/m²) | — | 35 | 35 | 35 | 35 | (Thickness) 1 mm |  |
| Metal Foil Layer | — | — | — | Al | Al | — |  |
| Thickness (μm) | — | — | — | 7 | 7 | — |  |
| Coextruded Layer (μm) Thickness (Total) | 50 × 2 | 90 | 50 × 2 | — | — | — |  |
| Total thickness (μm) | 115 | 130 | 612 | 157 | 200 | 596 | JIS P-8118 |
| Layer Constitution | FIG. 4 | FIG. 7 | FIG. 8 | FIG. 11 | FIG. 12 | FIG. 14 |  |

TABLE 4

|  | Invention | | | Conventional | | | Test Method |
| --- | --- | --- | --- | --- | --- | --- | --- |
|  | 8 | 9 | 10 | 3 | 4 | 5 |  |
| Young's Modulus*¹ (kg/mm²) Longitudinal | 108 | 108 | 108 | 27 | 27 | 28 | ASTM D-882 |
| Young's Modulus*¹ (kg/mm²) Lateral | 56 | 56 | 56 | 26 | 26 | 28 | ASTM D-882 |
| Tear Strength (g) Longitudinal | 698 | 543 | 673 | 183 | 294 | 1600< | JIS P-8116 |
| Tear Strength (g) Lateral | 1600< | 1600< | 1600< | 278 | 610 | 1600< | JIS P-8116 |
| Impact Puncture (kg/cm) | 17 | 13 | 21 | 4 | 6 | 23 | JIS P-8134 |
| Heat Seal Strength | A | A | B | C | C | C | I |
| Strength at Photographic Roll Film Insertion | A | B | A | E | E | E | VI |
| Strength after Vibration Test | A | B | A | E | E | E | VI |
| Wear Resistance after Vibration Test | A | B | A | E | E | E | VI |

*¹Inner Surface Layer

Evaluations in Table 1 were carried out as follows;
A very excellent
B excellent
C practical
D having a problem
E impractical I. Heat Seal Strength Two sheets of exemplified film having 15 mm in width were superposed, and sealed by heat sealing at a prescribed temperature at 1 kg/cm² of sealing pressure for one second. After cooling completely, the weight necessary to release a seal at the pulling angle of 180 degrees was determined.

II. Elapsed Heat Seal Strength

Two sheets of exemplified film having 15 mm in width were superposed, and sealed by heat sealing at a prescribed temperature at 1 kg/cm² of sealing pressure for one second. After being allowed to stand at 20° C. at 65% RH for 3 months, the weight necessary to release the seal at the pulling angle of 180 degrees was determined.

III. Corona Discharge Effect

Estimated based upon the variation of adhesive strength by the corona discharge treatment using an electric current of 110 V and 0.6 A at a laminating speed of 80 m/minute.

IV. Rigidity; According to JIS P-8125

V. Wear Resistance

Bags were made by using each exemplified film. A product having a weight of 3 kg was placed in the bag, and then sealed. This package was vibrated at JIS Level II of JIS Z 0232, and thereafter, the degree of damage of each exemplified film was inspected.

VI. Bags were made by using each exemplified film. A photographic roll film of 8 kg was placed in the bag, and each test was carried out.

I claim:

1. A packaging material for photographic photosensitive material consisting essentially of a coextruded double layer film prepared in the absence of a substrate having a thickness of 30 to 150 μm, containing 0.5 to 50 g/m² of a light-shielding material, and consisting of a linear low-density polyethylene resin layer having a thickness of 30 to 70% of total thickness of the coextruded double layer film and comprising linear low-density polyethylene resin having a melt index of 0.1 to 10 g/10 minutes and a density of 0.870 to 0.939 g/cm³ and a high-density polyethylene resin layer comprising high-density polyethylene resin having a melt index of 0.1 to 5 g/10 minutes and a density of 0.950 to 0.970 g/cm³.

2. The packaging material of claim 1 wherein said linear low-density polyethylene is a copolymer of ethylene and hexene-1, 4-methylpentene-1 or octene-1.

3. The packaging material of claim 1 wherein the layer on the side of the packaged photographic photosensitive materials contains said light-shielding material.

4. The packaging material of claim 3 wherein said layer is the high-density polyethylene resin layer.

5. The packaging material of claim 1 wherein said light-shielding material is carbon black or aluminum powder.

6. The packaging material of claim 1 wherein Young's modulus of said coextruded double layer film more than 50 kg/mm².

7. The packaging material of claim 1 wherein mean particle size of said light-shielding material is smaller than 50 mμ.

8. The packaging material of claim 1 wherein said light-shielding material is carbon black having a mean particle size of smaller than 200 mμ.

9. The packaging material of claim 1 wherein the thickness of said linear low density polyethylene resin layer is 40 to 60% of total thickness of the coextruded double layer film.

10. The packaging material of claim 1 wherein the melt index of the linear low density polyethylene resin is 0.3 to 8 g/10 minutes.

11. The packaging material of claim 1 wherein the linear low density polyethylene resin contains said light-shielding material.

12. The packaging material of claim 1 wherein the resin composing the high-density polyethylene resin layer is essentially consisting of said high-density polyethylene resin.

13. A packaging material for photographic photosensitive material comprised of a laminate containing a coextruded double layer film integrated through an adhesive layer, said coextruded double layer film consisting essentially of a coextruded double layer film prepared in the absence of a substrate, having a thickness of 30 to 150 μm, containing 0.5 to 50 g/m² of a light-shielding material, and consisting of a linear low-density polyethylene resin layer having a thickness of 30 to 70% of total thickness of the coextruded double layer film and comprising linear low-density polyethylene resin having a melt index of 0.1 to 10 g/10 minutes and a density of 0.870 to 0.939 g/cm³ and a high-density polyethylene resin layer comprising high-density polyethylene resin having a melt index of 0.1 to 5 g/10 minutes and a density of 0.950 to 0.970 g/cm³.

* * * * *